United States Patent [19]

Cooke

[11] Patent Number: 4,537,427

[45] Date of Patent: Aug. 27, 1985

[54] CLIP FOR A FLUID COUPLING

[75] Inventor: Horise M. Cooke, Weatherford, Tex.

[73] Assignee: Stratoflex, Inc., Fort Worth, Tex.

[21] Appl. No.: 311,533

[22] Filed: Oct. 15, 1981

Related U.S. Application Data

[63] Continuation-in-part of Ser. No. 294,846, Aug. 21, 1981, abandoned.

[51] Int. Cl.$^3$ .............................................. F16L 37/14
[52] U.S. Cl. ............................ 285/305; 285/DIG. 17; 73/53
[58] Field of Search ....................... 285/305, DIG. 17; 403/155, 379; 72/53

[56] References Cited

U.S. PATENT DOCUMENTS

| | | | |
|---|---|---|---|
| 2,077,639 | 4/1957 | Minich | 72/53 |
| 2,230,116 | 1/1941 | Kreidel | 285/DIG. 17 |
| 3,073,022 | 1/1963 | Bush et al. | 72/53 |
| 4,260,184 | 4/1981 | Greenawalt | 285/305 |

FOREIGN PATENT DOCUMENTS

| | | | |
|---|---|---|---|
| 1810347 | 9/1970 | Fed. Rep. of Germany | 285/305 |
| 1914465 | 10/1970 | Fed. Rep. of Germany | 285/305 |
| 2360921 | 6/1974 | Fed. Rep. of Germany | 285/305 |
| 1238801 | 7/1960 | France | 285/305 |
| 941545 | 11/1963 | United Kingdom | 285/305 |
| 1382348 | 1/1975 | United Kingdom | . |

*Primary Examiner*—Dave W. Arola
*Attorney, Agent, or Firm*—Marshall, O'Toole, Gerstein, Murray & Bicknell

[57] ABSTRACT

This disclosure relates to a fluid coupling including a nipple, an adapter sleeve, and a U-shaped clip for fastening the nipple and the sleeve together. The nipple has an annular rectangular-shaped groove therein and the sleeve has two circular bores therethrough. The inner part of the clip that engages the groove has a generally rectangular shape to match the groove, and the outer part of the clip is curved to match the curvature of the bores. The sides of the clip are treated to improve their resistance to deformation and stress failure.

12 Claims, 5 Drawing Figures

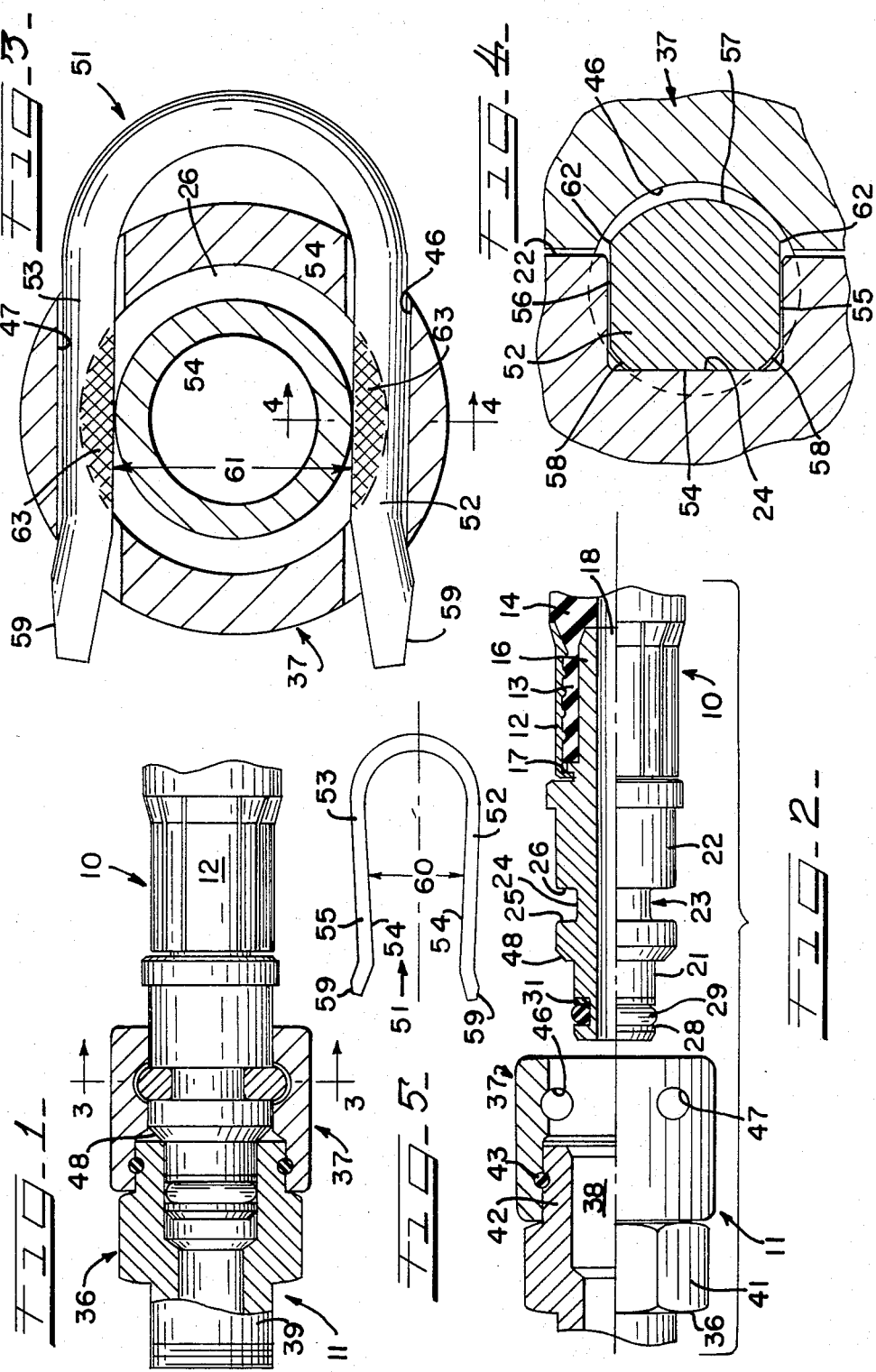

CLIP FOR A FLUID COUPLING

This application is a Continuation-In-Part of application Ser. No. 294,846 filed Aug. 21, 1981, of Horise M. Cooke, titled "Improved Clip For A Fluid Coupling" and now abandoned.

A type of coupling used, for example, to connect two lengths of hose in a pneumatic or hydraulic system, includes a fitting, an adapter and a clip or staple for releasably connecting the fitting and the adapter. This coupling has gained widespread use, particularly in the mining industry, in the United States and in Europe.

A coupling of this type is shown in Hemscheidt Great Britain Pat. No. 941,545 dated in 1963. The fitting 2 of the patent has an annular groove 3 in its outer surface and an adapter 5 has two straight bores or passages 4 through it, and a U-shaped clip is positioned in the groove and the passages in order to connect the parts. Both the groove and the clip have a rectangular cross section, while the passages have a circular cross section.

Examples of other couplings of this type are shown in French Pat. No. 1,238,801 (1960), Offenlegungsschrift No. 1,810,347 (1970), Offenlegungsschrift No. 2,605,777 (1977), Swiss Pat. No. 569,915 (1975), U.S. Pat. Nos. 2,413,106 (1946) and 4,260,184 (1981), and German Offenlegungsschrift No. 2,360,921 (1974) where the clip has both straight and curved surfaces. In addition, U.S. Pat. Nos. 3,490,795 (1970), and 3,973,791 (1976) show couplings including a pin or staple having a circular cross section.

A problem arising during the use of fittings as described above, has to do with the stresses on the U-shaped clip or staple, and some of the patents mentioned above refer to the problem and propose solutions. With reference to British Pat. No. 941,545, the outer corners of the square-shaped clip engage the curved surface of the round passages 4 formed in the member 5, and such an arrangement results in high stress concentrations which can produce deformation and failure of the clip. A stated object of U.S. Pat. No. 4,260,184 is to avoid these disadvantages, and this is accomplished by making the clip "D-shaped" in cross section, by having the curved outer surface of the clip engage the outer bore surface of the adapter, and by making the curvature of the outer surface less than the curvature of the bore that receives it.

However, the coupling described in Pat. No. 4,260,184 has shortcomings. With reference to FIG. 3 of the patent, the bottom 64 of the staple is spaced from the bottom 40 of the circular groove 34 of the part 10, and consequently there is a relatively short surface engagement between the vertical (as seen in FIG. 3) sides of the staple and the groove. It should be kept in mind that each leg of the staple engages only a short arc of the groove 34 as shown in FIG. 2, and since the legs are at the outer surfaces of the bores 46, 48, there is relatively little surface engagement between the vertical sides of the legs and the groove. It is substantially less than the prior art construction shown in FIG. 6 of the patent. In addition, the diameter of the outer surface of the staple is less than the diameter of the bores, and consequently the area of contact between the staple and the bore surfaces is not much greater than existed in the prior art arrangement shown in FIG. 6 of the patent. Where a coupling as shown in this patent is subjected to "hammering" during use, the repeated impact between the sides of the staple and the groove can cause an arcuate notch to form on the side of the staple adjacent the radially outer edge of the groove. A ridge adjoins the notch, and such a notch and ridge can be the originating point of a stress failure arising from a stress produced crack.

It is a general object of the present invention to provide an improved coupling that reduces the possibility of deformation and failure as described above.

An improved coupling in accordance with the present invention comprises a tubular adapter sleeve, a tubular nipple that is inserted coaxially into the sleeve when the parts are assembled, and a U-shaped clip for fastening the sleeve and the nipple together. The nipple has an annular rectangular shaped groove in its outer periphery which receives the legs of the clip, the legs being closely adjacent the bottom of the groove. The sleeve has two circular bores formed therethrough which receive the legs of the clip. The inner periphery of the legs of the clip are generally rectangular-shaped to match the shape of the groove, and the outer periphery is curved. The outer periphery has a radius that is substantially equal to the radius of the two bores, and the outer periphery is normally out of engagement with the surface of the bores when the parts are in a neutral position. The sides of the clip are treated to improve its resistance to stress failure.

The foregoing and other objects and advantages of the present invention will become apparent from the following detailed description taken in conjunction with the accompanying figures of the drawing, wherein:

FIG. 1 is a view partially in section of a coupling including an improved clip in accordance with the invention;

FIG. 2 is an exploded view partially in section of the coupling shown in FIG. 1;

FIG. 3 is an enlarged sectional view taken on the line 3—3 of FIG. 1;

FIG. 4 is a further enlarged, fragmentary, sectional view taken on the line 4—4 of FIG. 3; and FIG. 5 is a view of the clip.

With reference to FIGS. 1 and 2, the coupling includes a hose fitting 10 and an adapter 11. Of course, the structure shown in the drawing and described herein is a specific example of the invention and other arrangements of the fitting and adapter are contemplated. The hose fitting 10 includes, at one end thereof, a socket or sleeve 12 that fits around an end portion 13 of a length of hose 14, and a nipple portion 16 that extends into the interior of the portion 13 of the hose. The nipple 16 and the socket 12 preferably have teeth or projections of some kind in order to firmly engage and grip the hose 14. As best shown in FIG. 1, in the specific example shown in the drawing, the socket 12 is deformed radially inwardly in order to compress the hose, by swaging the socket 12. The socket 12 and the nipple 16 are further connected together by a radial flange and groove arrangement indicated by the numeral 17. The nipple 16 is tubular and a fluid passage 18 is formed axially of the fitting in order to carry fluid to or from the hose 14 and the adapter 11.

At the other end of the tubular nipple 16, the outer periphery thereof has a reduced diameter section 21 and an intermediate diameter section 22. The section 22 has an annular groove 23 formed therein which has a generally rectangular shape in cross section. The groove includes a bottom wall 24 that extends substantially parallel to the axis of the tubular nipple, and two spaced radially extending walls 25 and 26 which are connected by the bottom wall 24. The inner corners of the groove 23, where the walls 25 and 26 meet the wall 24, are curved or radiused in order to avoid stress buildup. Similarly, the outer corners of the groove 23, where the walls 25 and 26 meet the surface of the section 22 are curved to avoid sharp edges in contact with a clip 51 to be described.

The reduced diameter section 21 of the nipple has a seal groove 28 formed therein which receives an O-ring 29. An annular backup ring 31 is preferably positioned in the groove 28 behind the O-ring 29.

The adapter 11 includes an adapter body 36 and a swivel nut 37. The body 36 and the nut 37 are also tubular and form a fluid passage 38 therethrough which connects with the passage 18 of the nipple when the parts are assembled. In the present specific example, the end toward the left as seen in FIG. 1 has external threads 39 formed thereon so that the adapter may be connected to another component of a fluid system. Hexagonal flat sides 41 are preferably also formed on the body 36 so that the body may be engaged by a wrench (not shown) when the body 36 is attached to another component.

The other end of the body 36 has a reduced diameter portion 42 formed on its outer surface and the swivel nut 37 fits around the portion 42. The engaging surfaces of the portion 42 and the nut 37 have annular grooves formed therein, and a swivel or circular connecting pin 43 is forced into the grooves in order to hold the parts in assembly. The pin 43, of course, permits the swivel nut 37 to rotate but prevents disassembly of the body 36 and the nut 37.

As best shown in FIGS. 2 and 3, the swivel nut 37 has two bores 46 and 47 formed therethrough, the bores having a circular cross section as shown in FIG. 2. The two bores 46 and 47 extend tangentially of the nipple when the parts are assembled as shown in FIG. 3. The nipple is inserted into the passage 38 when the parts are assembled, the O-ring 29 making sealing engagement with the wall of the passage 38 of the body 36. A slanted step 48 of the nipple engages an end of the body 36 and thus forms a stop when the parts are assembled, and at this position of the parts, the two bores 46 and 47 are in alignment with the groove 23 and the bores overlie the groove as shown in FIG. 4.

The coupling still further includes a generally U-shaped clip 51 (FIGS. 3 and 5) having two legs 52 and 53. As best shown in FIG. 4, the inner periphery or side of each of the legs 52 and 53 has a generally rectangular shape in cross section, each of the legs including a bottom side 54 and two radial sides 55 and 56. The axial thickness of each leg, which is the distance between the sides 55 and 56 (see FIG. 4), is slightly less than the axial width of the groove 23 so that the legs can be inserted into the groove. The fourth side 57 of each of the legs 52 and 53 is formed by a curved or arcuate surface. As best shown in FIG. 4, the radius of the side 57 being substantially equal to the radius of the two bores 46 and 47. The corners 58 at the inner periphery of the legs of the clip are removed or shaped so that the legs of the clip may engage the bottom wall 24 of the groove 23. The radial thickness of the legs 52 and 53 is sized so that the curved outer side 57 is out of engagement with the wall of the bores when the parts are in a neutral position. By a neutral position (shown in FIG. 4), it is meant that position which is obtained when the parts are not under pressure and the center points of the groove and the bores are substantially in line.

As shown in FIGS. 3 and 5, the outer ends of the two legs 52 and 53 are preferably bent slightly outwardly and away from each other in order to retain the clip in the bores 46 and 47 during use. The outer surfaces 59 at the ends of the legs are preferably bevelled to enable the parts to be assembled and disassembled. As shown in FIG. 3, the distance between the inner sides 54 of the two legs 52 and 53, this distance being indicated by the reference numeral 61 in FIG. 3, is substantially equal to the diameter of the bottom wall 24 of the groove 23 when the parts are assembled, so that the inner sides 54 of the two legs engage the bottom wall 24 of the groove. With reference to FIG. 5, the distance 60 between the inner surfaces of the legs prior to assembly of the parts is preferably less than the distance 61. Consequently the legs must be forced apart slightly when assembling the parts, thereby ensuring that the inner surfaces of the legs tightly engage the surface 24 due to the spring tension of the legs. Further, as shown in FIG. 4, the intersection 62 of the radial sides 55 and 56 with the curved outer side 57, is spaced radially outwardly from the outer surface of the section 22 of the nipple so that a large bearing or engagement area is obtained between the nipple and the legs. In FIG. 3, this large bearing or engagement area is indicated by the cross-hatched areas 63. As shown in FIG. 4, the radial dimension of the sides 55 and 56 is greater than that of the walls 25 and 26.

When assembling the fitting and the adapter, the fitting is inserted into the bore 38 of the adapter until the step 48 meets the end of the body 36. The tapered ends 59 of the clip 51 are then inserted into the bores 46 and 47 and forced through the bores until the ends 59 extend from the opposite ends of the bores. At this position, the midsections of the two legs 52 and 53 engage arcuate portions of the groove 23, as shown in FIG. 3, and thereby prevent the fitting 10 from being withdrawn from the adapter 11. When pressure is applied internally of the passages 18 and 38, the O-ring 29 prevents loss of fluid and the pressure, and normally the pressure tends to separate the fitting from the adapter. Such pressure, with reference to FIG. 4, causes the swivel nut 37 to move, for example, downwardly relative to the nipple of the fitting (the nipple moves toward the right in FIG. 1). Such movement causes the walls of the bores 46 and 47 to engage the outer curved sides 57 of the legs of the clip and to move the legs toward the right until the sides 55 of the legs engage the wall 26 of the groove 23 over the area 63. There are relatively large engaging surface areas between the clip legs and the fitting and the swivel nut as compared with prior art fittings, and the large engaging surfaces reduce deformation and stress failures of the clip. The fact that the radius of the side 57 is substantially the same as the radius of the two bores 46 and 47 prevents line contact between the legs and the swivel nut and reduces torque about the axes of the legs of the clip. In prior art clips, the forces on the legs produce relatively large torque, which tends to twist the clip and produce ridges on the legs adjacent the outer corners of the groove. Further, the fact that the legs of the clip 51 engage the bottom wall 24 of the groove insures the maximum possible contact area between the sides of the clip and the walls of the groove.

During certain operating conditions, such as when "hammering" occurs, the fluid pressure may force the parts in the opposite direction to that described above, but since the parts are symmetrical about a radial line extending through the center of the groove 23, the same conditions described previously will again exist.

In prior art clips, the forces exerted by the nipple and the swivel nut on the clip cause the legs of the clip to twist as previously mentioned. The outer corners of the groove, comparable to the intersections between the sides 55 and 56 with the outer surface 22 of the applicant's construction, produce arcuate notches in the sides of the clip, and ridges or protrusions are formed radially outside the notches. Such notches are the starting points of stress cracks in the legs, which result in failure of the clip.

It is another feature of this invention that the clip disclosed herein is manufactured and treated in such a way as to minimize the danger of failure as described above. Normally a clip for such a fitting is made from a length of an extruded metal which is heat-treated, and these processes result in a layer of metal on the outer surface that contains impurities such as oxides and non metallic materials. These impurities result in an outer layer that is not as tough and as stress-resistant as the purer inner base material. In accordance with the invention, the outer layer is treated or removed at the two sides 55 and 56 of the clip. The type of metal used is, for example, a high carbon steel such as SAE 1065 steel.

As a specific example of a method of forming the clip, first a rod of metal of the type normally used for such a clip is extruded or drawn to the general shape shown in cross section in FIG. 4. The extruded or drawn rod is cut to a given length and the length is bent to the U-shape shown in FIG. 3. The bent clip is then heat-treated in order to harden it, and thereafter the two sides 55 and 56 are surface ground as by a grinding operation to expose the tougher base material. Thereafter, the clip is preferably plated and baked in order to relieve stresses.

In still another method of making the clip, the metal is extruded or drawn generally to the shape shown in FIG. 4 and then the extruded or drawn length of material is pulled through a shaving machine which removes the outer layer from the two sides 55 and 56 and exposes the base metal. The shaved metal is then cut to lengths and bent to the U-shape form, heat-treated, plated and baked as mentioned in the previous specific example.

Instead of removing material by grinding or shaving, the clip may be treated by carborizing the surface or by shot peening it. Both of these treatments harden the surface and thereby reduce the tendency of the clip to be notched, but the carborizing treatment must be carefully controlled to prevent the metal from becoming too brittle.

It will be apparent from the foregoing that an improved clip for a coupling has been provided. The surface bearing areas between the clip, the nipple and the swivel nut are relatively large in order to reduce the surface stresses between the parts during operation. Further, the radial sides of the clip are treated to make it relatively tough and stress resistant and such a clip is relatively resistant to stress failure and resistant to the formation of ridges and notches at the locations where the legs of the clip engage the radially outer corners of the walls 25 and 26 of the groove 23.

A most important feature of the invention is the avoidance of the described ridge and notch that occur in prior art constructions, which can lead to stress generated failures due to bending fatigue. Such failures are avoided, or at least substantially reduced, by treating the surface of the clip and by maximizing the surface area engagement between the clip, the nipple and the socket. In addition to the previously described methods of treating the surface by grinding or by shaving, the clip surface may instead be treated by a carborizing process or by a controlled shot peening process. In the carborizing process, carbon is added to the base material at the surface in order to strengthen it; in the peening process, the clip is bombarded with small pieces of a hard material in order to make the material more dense and thereby strengthen it. To ensure that the legs of the clip engage the bottom 24 of the groove 23, the distance 61 is initially, in its unstressed state, made slightly less than the diameter of the surface 24 so that the legs must be sprung apart slightly when the parts are assembled.

I claim:

1. In a coupling including a tubular nipple part and a tubular adapter sleeve part, said parts having an axially extending flow passage formed therethrough, and said sleeve part being positioned around a portion of said nipple part when said parts are in fully assembled relation, said nipple part having an annular groove formed in the outer periphery thereof and said sleeve part having two bores formed therethrough, said bores being generally radially aligned with said groove and extending generally tangentially of said groove when said parts are assembled, said groove being generally rectangular in radial cross section and including two spaced radial side walls and an axially extending bottom wall connecting said radial side walls, and said bores being generally circular in cross section and overlying said groove when said parts are assembled, the improvement of a U-shaped clip comprising a pair of generally parallel legs and a curved center part that connects said legs, said legs thereof being positioned in said bores and groove for holding said parts in assembled relation, each of said legs having two radial sides and a bottom side interconnecting said radial sides, said sides of said legs being substantially parallel to said walls of said groove, the radial distance between said bottom sides of said legs being substantially equal to the diameter of said bottom wall whereby said bottom sides substantially engage said bottom wall, said radial sides of said legs being engageable with said radial side walls of said groove, each of said legs further having an arcuate outer side that connects said radial sides and is opposite from said bottom side, said arcuate outer side connecting with said radial sides closely adjacent said radial sides of said groove, said outer side having substantially the same radius as said bores and the radially outermost part of said arcuate outer side being spaced from the wall of said bore to form a clearance between said outermost part and said wall, portions of said radial sides of said legs being adapted to engage said radial side walls of said groove and said sleeve part being adapted to engage a surface of said arcuate outer side closely adjacent to the juncture of said arcuate outer side with a radial side and thereby reduce twisting of each arm, and said arcuate outer side extends radially outwardly from said surface of engagement of said sleeve part with said legs.

2. Apparatus as in claim 1, wherein said outer sides of said legs are radially spaced from said bores when said parts are in a neutral position.

3. Apparatus as in claim 1, wherein the radially inner corners of said clip are removed.

4. Apparatus as in claim 1, wherein the ends of said legs are bent away from each other and are tapered.

5. Apparatus as in claim 1, wherein said sides of said clip are surface hardened.

6. Apparatus as in claim 1, wherein said arcuate outer side of said clip has an arc of less than 180°.

7. Apparatus as in claim 1, wherein said sides of said clip are surface hardened by shot peening.

8. A coupling comprising a tubular nipple part and a tubular adapter sleeve part, said parts having an axially extending flow passage formed therethrough, and said sleeve part being positioned around a portion of said nipple part when said parts are in fully assembled relation, said nipple part having an annular groove formed in the outer periphery thereof and said sleeve part having two bores formed therethrough, said bores being generally radially aligned with said groove and extending generally tangentially of said groove when said parts are assembled, said groove being genrally rectangular in radial cross section and including two spaced radial side walls and an axially extending bottom wall connecting said radial side walls, and said bores being generally circular in cross section and overlying said groove when said parts are assembled, a U-shaped clip comprising a pair of generally parallel legs and a curved center part that connects said legs, said legs thereof being positioned in said bores and groove for holding said parts in assembled relation, each of said legs having two radial sides and a bottom side interconnecting said radial sides, said sides of said legs being substantially parallel to said walls of said groove, the radial distance between said bottom sides of said legs being substantially equal to the diameter of said bottom wall whereby said bottom sides substantially engage said bottom wall, said radial sides of said legs being engageable with said radial side walls of said groove, each of said legs further having an arcuate outer side that connects said radial sides and is opposite from said bottom side, said arcuate outer side connecting with said radial sides closely adjacent said radial sides of said groove, said outer side having substantially the same radius as said bores and the radially outermost part of said arcuate outer side being spaced from the wall of said bore to form a clearance between said outermost part and said wall, portions of said radial sides of said legs being adapted to engage said radial side walls of said groove and said sleeve part being adapted to engage a surface of said arcuate outer side closely adjacent to the juncture of said arcuate outer side with a radial said and thereby reduce twisting of said arm, and said arcuate outer side extends radially outwardly from said surface of engagement of said sleeve part with said legs.

9. Apparatus as in claim 8, wherein said sides of said clip are surface hardened.

10. Apparatus as in claim 8, wherein said sides of said clip are surface hardened by shot peening.

11. A U-shaped clip for use with a coupling including a tubular nipple part and a tubular adapter sleeve part, said parts having an axially extending flow passage formed therethrough, and said sleeve part being positioned around a portion of said nipple part when said parts are in fully assembled relation, said nipple part having an annular groove formed in the outer periphery thereof and said sleeve part having two bores formed therethrough, said bores being generally radially aligned with said groove and extending generally tangentially of said groove when said parts are assembled, said groove being generally rectangular in radial cross section and including two spaced radial side walls and an axially extending bottom wall connecting said radial side walls, and said bores being generally circular in cross section and overlying said groove when said parts are assembled, said U-shaped clip comprising a pair of generally parallel legs and a curved center part that connects said legs, said legs being surface hardened and adapted to be positioned in the bores and groove for holding the parts in assembled relation, each of said legs having two radial sides and a bottom side interconnecting said radial sides, said sides of said legs being adapted to extend substantially parallel to the walls of the groove, the radial distance between said bottom sides of said legs being substantially equal to the diameter of the bottom wall whereby said bottom sides are adapted to substantially engage the bottom wall, said radial sides of said legs being engageable with the radial side walls of the groove, each of said legs further having an arcuate outer side that connects said radial sides and is opposite from said bottom side, said arcuate outer side connecting with said radial sides closely adjacent said radial sides of said groove, said outer side having substantially the same radius as the bores and the radially outermost part of said arcuate outer side being spaced from the wall of said bore to form a clearance between said outermost part and said wall, portions of said radial sides of said legs being adapted to engage the radial side walls of the groove and the sleeve part being adapted to engage a surface of said arcuate outer side closely adjacent to the juncture of said arcuate outer side with a radial side and thereby raduce twisting of each arm, and said arcuate outer side extends radially outwardly from said surface of engagement of said sleeve part with said legs.

12. A clip according to claim 11 wherein said legs are surface hardened by shot peening.

* * * * *